US009637109B1

(12) United States Patent
Johri et al.

(10) Patent No.: US 9,637,109 B1
(45) Date of Patent: May 2, 2017

(54) HYBRID ELECTRIC VEHICLE

(71) Applicant: Ford Global Technologies, LLC, Dearborn, MI (US)

(72) Inventors: Rajit Johri, Canton, MI (US); Mark Steven Yamazaki, Canton, MI (US); Xiaoyong Wang, Novi, MI (US); Jason Meyer, Canton, MI (US); Jeffrey Allen Doering, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/007,820

(22) Filed: Jan. 27, 2016

(51) Int. Cl.
*B60W 20/00* (2016.01)
*B60W 20/10* (2016.01)
*B60W 10/06* (2006.01)
*B60W 10/08* (2006.01)

(52) U.S. Cl.
CPC ............ *B60W 20/10* (2013.01); *B60W 10/06* (2013.01); *B60W 10/08* (2013.01); *B60W 2510/246* (2013.01); *B60W 2540/10* (2013.01); *B60W 2710/0666* (2013.01); *B60W 2710/083* (2013.01); *Y10S 903/915* (2013.01); *Y10S 903/951* (2013.01)

(58) Field of Classification Search
CPC ............................................. B60W 20/00
See application file for complete search history.

(56) References Cited

U.S. PATENT DOCUMENTS 7,076,356 B2 7/2006 Hubbard et al.
7,638,980 B2 * 12/2009 Zettel .................... B60L 3/0046 307/10.1
7,908,064 B2 3/2011 Cawthorne et al.
8,116,926 B2 2/2012 Okubo et al.
8,145,375 B2 3/2012 Hsieh et al.
8,209,097 B2 6/2012 Heap
8,489,293 B2 * 7/2013 Heap ........................ B60K 6/26 477/120
8,897,941 B2 11/2014 Patel et al.
9,026,293 B2 5/2015 Ito et al.
2009/0112416 A1 * 4/2009 Heap ...................... B60K 6/365 701/54
2014/0081499 A1 3/2014 Ito et al.
2014/0266038 A1 * 9/2014 Gibeau ............... B60L 11/1875 320/109
2015/0038296 A1 2/2015 Toyota
2015/0151736 A1 6/2015 Kim
2015/0166048 A1 * 6/2015 Herrmann ............ B60W 20/40 701/22
2015/0197242 A1 7/2015 Yamazaki et al.
2015/0318724 A1 * 11/2015 Brockman ............ H02J 7/0047 320/152

* cited by examiner

*Primary Examiner* — Thomas Tarcza
*Assistant Examiner* — Alex C Dunn
(74) *Attorney, Agent, or Firm* — David Kelley; Brooks Kushman P.C.

(57) ABSTRACT

A vehicle includes a traction battery and an electric machine electrically connected to the battery. The vehicle further includes a controller configured to, during an inertia phase of a transmission shift from first gear to second gear at a constant accelerator pedal position while battery temperature is less than zero degrees Fahrenheit, alter a torque output by the electric machine to offset inertia torque transfer to a driveline to maintain constant acceleration of the vehicle.

20 Claims, 5 Drawing Sheets

52
50
PCU
14
28
30
18
16
30
34 32
38
37
M/G
26
22
24
Power Electronics
56
12
54
20
Battery
10
42
44
40
44
42

HYBRID ELECTRIC VEHICLE

TECHNICAL FIELD

The present disclosure relates to hybrid electric vehicles.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a vehicle includes a traction battery and an electric machine electrically connected to the battery. The vehicle further includes a controller configured to, during an inertia phase of a transmission shift from first gear to second gear at a constant accelerator pedal position while battery temperature is less than zero degrees Fahrenheit, alter a torque output by the electric machine to offset inertia torque transfer to a driveline to maintain constant acceleration of the vehicle.

According to another embodiment, a vehicle includes an electric machine coupled to a driveline and a controller. The controller is configured to, in response to vehicle braking while traction battery temperature is less than zero degrees Fahrenheit, command the electric machine to apply a regenerative torque to the driveline such that the torque increases at a constant rate for an entirety of a blend-in phase, that follows a lash phase and ends at a steady state phase, of the electric machine.

According to yet another embodiment, a vehicle includes an engine and an electric machine selectively coupled to the engine via a clutch. The vehicle further includes a controller configured to, in response to an engine start request while a traction battery temperature is less than zero degrees Fahrenheit, engage the clutch to start the engine and apply torque to the engine via the electric machine to maintain constant acceleration of the vehicle during starting of the engine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
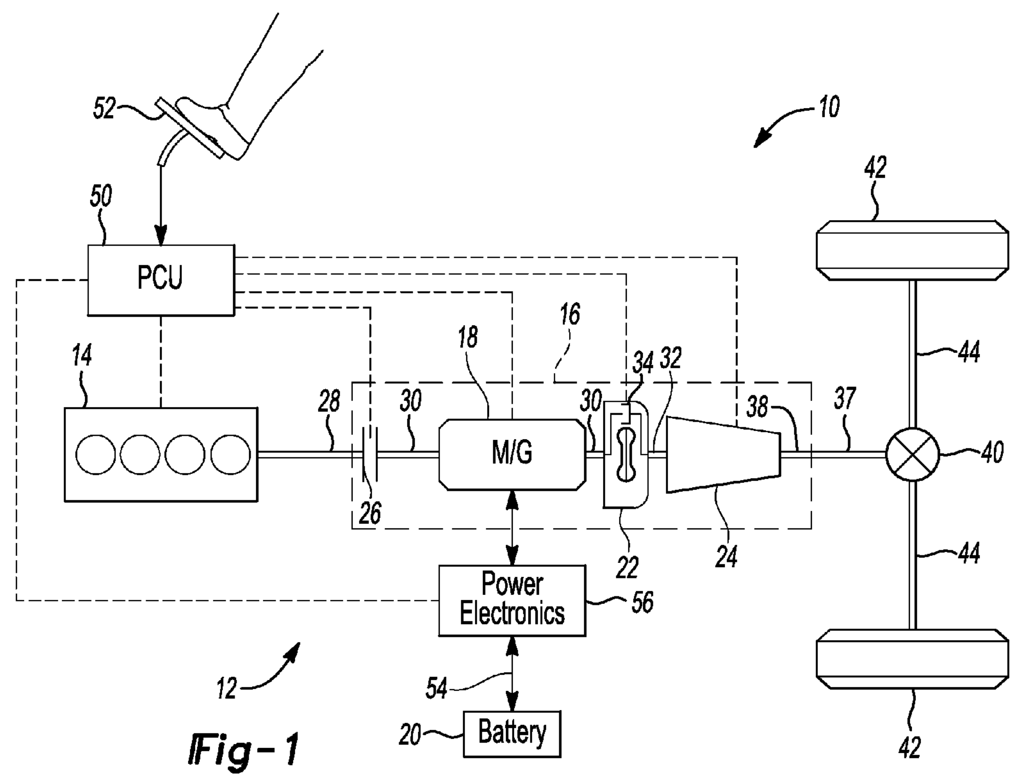
FIG. 1 is a schematic diagram of an example hybrid-electric vehicle.

Referring to FIG. 1, a schematic diagram of a hybrid-electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular-hybrid transmission (MHT). As will be described in further detail below, a transmission 16 includes an electric machine such as an electric motor/generator (M/G) 18 (, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal-combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three-phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. A shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via the shaft 30. The torque converter 22 is therefore connected to the engine 14 when the disconnect clutch 26 is at least partially engaged. The torque converter 22 includes an impeller fixed to the shaft 30 and a turbine fixed to a transmission input shaft 32. The torque converter 22 provides a hydraulic coupling between the shaft 30 and the transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may be provided to, when engaged, frictionally or mechanically couple the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 32. The gearbox 24 is automatically shifted from one ratio to another based on various vehicle and ambient operating conditions by an associated controller, such as a powertrain-control unit (PCU). The gearbox 24 then provides powertrain output torque to output shaft 38. The output shaft 38 may be connected to a driveline 37 (e.g. a driveshaft and universal joints) that connects the output shaft 38 to the differential 40.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 38 may be connected to a driveline 37 that connects the output shaft 38 to the differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain-control unit (PCU). While illustrated as one controller, the controller 50 may be part of a larger control system and may be controlled by various other controllers throughout the vehicle 10, such as a vehicle-system controller (VSC) and a high-voltage battery controller (BECM). It is to be understood that the powertrain-control unit 50 and one or more other controllers can collectively be referred to as a "controller" that controls various actuators in response to signals from various sensors to control functions such as starting/stopping engine 14, operating M/G 18 to provide wheel torque or charge the battery 20, select or schedule transmission shifts, etc. The controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine, traction battery, transmission, or other vehicle systems.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 50 may communicate signals to and/or from the engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air-conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle-valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. The pedal 52 may include a pedal position sensor. In general, depressing and releasing the pedal 52 causes the pedal sensor to generate an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of the gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the “engine mode,” “engine-only mode,” or “mechanical mode.”

The M/G 18 may assist the engine 14 by providing additional power to turn the shaft 30. This operation mode may be referred to as a “hybrid mode,” an “engine-motor mode,” or an “electric-assist mode.”

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter and a DC/DC converter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive (e.g. drive) or negative (e.g. regenerative) torque to the shaft 30. This operation mode may be referred to as an “electric only mode,” “EV (electric vehicle) mode,” or “motor mode.”

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

The vehicle 10 may provide torque to one or more of the vehicle components using torque generated by the engine 14, the M/G 18, or a combination of the engine and the M/G. For example, a driver-demanded torque for propelling the vehicle is met by a combination of the engine 14 and the M/G 18. In order to deliver the driver-demanded torque (or other torque request), the controller 50 must accurately predict the available torque of the engine and the M/G to ensure the powertrain is actually capable of delivering the requested torque. This is more important for the M/G 18 than for the engine 14 because the M/G typically has less available torque than the engine.

The torque limits of the M/G 18—both maximum (also known as drive torque and positive torque) and minimum (also known as regenerative torque and negative torque)—are a function of mechanical hardware limits and available battery power corrected for M/G electrical losses. Thus, the M/G 18 has a mechanical torque limit (herein “mechanical limit”), and a battery power limit including electrical losses (herein “battery limit”). At any given instant, the M/G 18 may be limited by the mechanical limit or the battery limit depending upon operating conditions.

Figure 2:
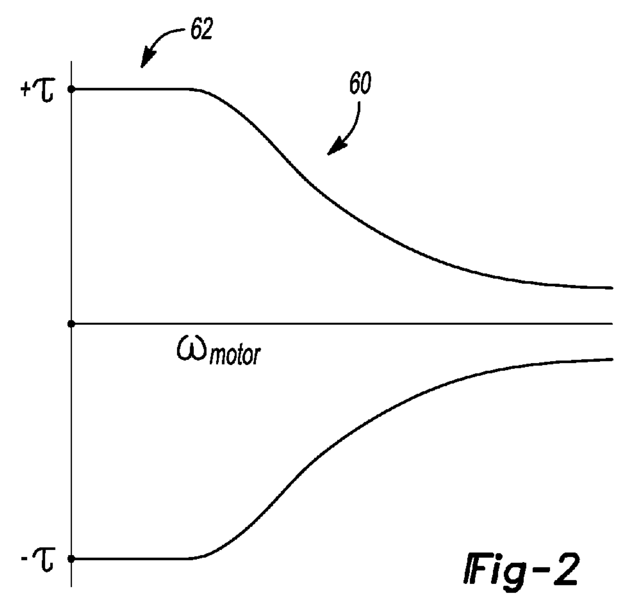
FIG. 2 is a torque plot for an example electric machine.

The mechanical limits ($\tau^{m}_{max}$ and $\tau^{m}_{min}$) of the M/G 18 are a function of at least M/G speed and voltage. Referring to FIG. 2, an example torque curve 60 is shown. The y-axis is torque, in Newton meters (Nm), and the x-axis is M/G speed, in radians per second. The example M/G has a generally constant maximum and minimum torques for a first range of M/G speeds 62. After the first range of speeds, the maximum and minimum torques substantially diminish as M/G speed increases. The vehicle 10 may store one or more torque curves, similar torque curve 60, in one or more lookup tables stored in the vehicle memory, and retrieve the torque data from the memory when needed.

The battery limits ($\tau^b{}_{max}$ or $\tau^b{}_{min}$) are a function of the traction battery power limit minus, or plus, the M/G losses, respectively. The battery power limit is a function of at least the state of charge (SOC), and the battery temperature. The battery power limits may be stored in one or more lookup tables accessible by the controller 50. The M/G losses are a function of M/G torque: As the M/G torque increases, M/G losses tend to also increase. The maximum and minimum battery limits can be calculated using equations 1 and 2, respectively:

$$\tau^b_{max} = \frac{P_{Dchrg} - f^{map}(\tau, \omega)}{\omega} = \frac{P_{Dchrg} - P^{mtr}_{loss}}{\omega} \quad (1)$$

$$\tau^b_{min} = \frac{P_{Dchrg} + f^{map}(\tau, \omega)}{\omega} = -\frac{P_{chrg} + P^{mtr}_{loss}}{\omega} \quad (2)$$

where $P_{Dchrg}$ and $P_{Chrg}$ is the discharge and charge traction battery power limits respectively, co is M/G speed, and $f_{map}$ ($\tau$, $\omega$) or $P_{lodd}{}^{mtr}$ is the M/G power loss at present M/G torque and speed.

The maximum and minimum M/G torque limits are constrained by either the mechanical limits or the battery limits. Equation 3 is for determining the maximum torque limits ($\tau_{max}$) and equation 4 is for determining the minimum torque limits ($\tau_{min}$):

$$\tau_{max}=\text{minimum}(\tau^b{}_{max},\tau^m{}_{max}) \quad (3)$$

$$\tau_{min}=\text{maximum}(\tau^b{}_{min},\tau^m{}_{min}) \quad (4)$$

The vehicle 10 may rely on torque from the M/G 18 to preform several tasks including engine start, torque modification during transmission shifts, and regenerative braking. Prior to performing these tasks, the controller 50 calculates a torque split between the engine 14 and the M/G 18 (ranging between 100% M/G and 100% engine). In order to maximize fuel economy, the controller 50 may request maximum available torque from the M/G 18 to reduce the workload of the engine 14. The torque split is calculated at a time prior to the task being performed, albeit milliseconds. If the controller 50 overestimates available torque of either the engine or the M/G, the task may be performed poorly, or not at all (i.e. failed task). Therefore, it is important that the controller 50 accurately predict the torque limits of the M/G. Inaccurate calculations of the available torque of the M/G are especially problematic in WIT powertrains (i.e. topologies where the M/G and the engine are on a same shaft that delivers torque into a step-ratio transmission), because the M/G has less available torque than the engine, and yet, the M/G is called upon to perform operations normally handled by the engine. Conservatively estimating the M/G losses to calculate the available torque of the M/G is not a viable option, because it needlessly increases the duty cycle of the engine and reduces the benefits of the electronic assist of the M/G. To maximize the potential benefits of the MHT powertrain, the M/G 18 is instructed to provide its maximum available torque limit to reduce engine workload.

MHT vehicles are different than other hybrid topologies (such as power split) in that the M/G torque limits are typically much less than the engine torque limits. Despite this torque difference, it is both desired and expected that the M/G 18 will perform powertrain operations such as torque modulation during transmission shifting, which would normally be accomplished by the engine 14. For this reason, the controller 50 in MHT vehicles will attempt to use a near maximum (or minimum) amount of torque from the M/G 18 and calculate the torque split based on that torque. In other hybrid topologies, such as power split, the engine and motor are closer in torque capability and calculating a conservative motor-torque limit that covers every operation is sufficient.

Because M/G power losses are a function of M/G torque, the losses change dynamically as the torque output of the M/G changes. Calculating M/G losses based on present M/G torque may result in overestimating maximum and underestimating minimum M/G torque limits due to smaller M/G losses at the present torque level than at the future torque level. This results in the M/G being either unable to provide the previously calculated torque or not fully applying potentially available torque from the M/G. If the M/G is unable to provide the previously calculated torque or not fully applying the available M/G torque, vehicle operations (such as engine start, torque modification during shifts, and regenerative braking) will be performed unsatisfactorily or not at all. As stated above, conservatively estimating the losses is not a viable option. Thus, the controller 50 must accurately calculate the anticipated torque limits of the M/G for the future event based on the losses that will be present at the anticipated torque limit.

Below are three example tasks that highlight issues associated with overestimation of the torque limits. The first example is during regenerative braking, the second example is transmission shift modification, and the third example is engine start.

Referring to example one, during regenerative braking, the M/G 18 operates as a generator and applies a negative torque (i.e. in a direct opposite the crankshaft rotation) to the shaft 30 to convert kinetic energy of the driveline to electrical energy for recharging the traction battery 20. In response to the vehicle braking, the controller 50 calculates a braking split between the M/G 18 and the friction brakes.

Figure 3:
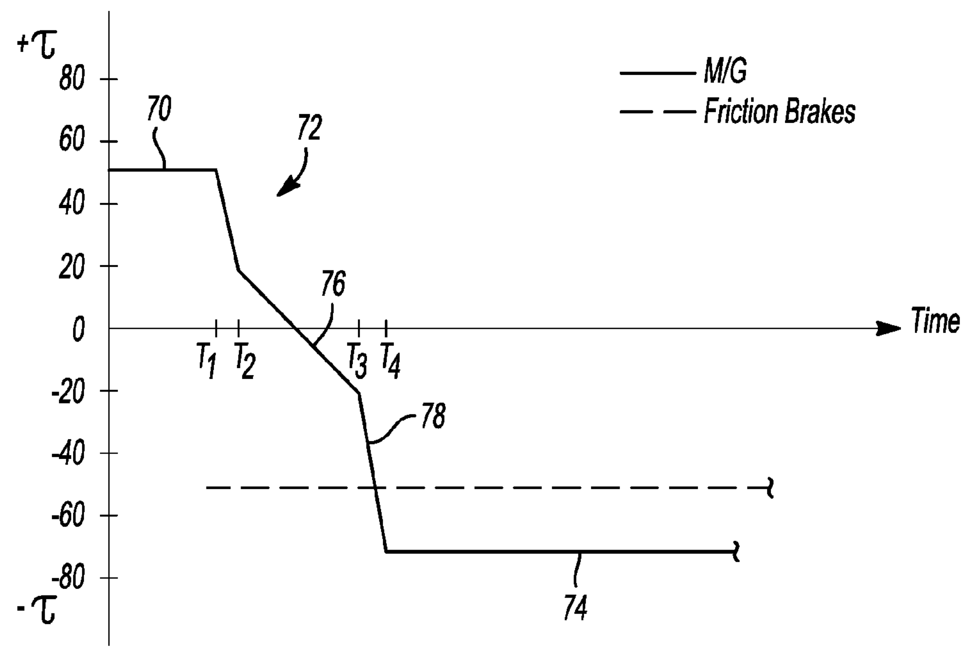
FIG. 3 is a regenerative torque plot for a braking event according to a control strategy that calculates motor losses at an expected torque output.

FIG. 3 illustrates a torque plot for the M/G 18 and the friction brakes when the M/G torques limits are correctly anticipated. The y-axis is torque and the x-axis is time. Prior to time $T_1$, the vehicle is moving forward down the road and the M/G is supplying a steady-state positive torque 70. In response to the vehicle braking, the controller 50 calculates a braking-duty split between the M/G 18 and the friction brakes. At time $T_1$, the friction brakes are applied and the M/G 18 begins transitioning from providing a positive torque to providing a negative torque. The M/G torque plot include a transition region 72 defined between the positive torque steady-state phase 70 and the negative torque steady-state phase 74. While the M/G switches quickly from the positive steady-state phase 70 to the negative steady-state phase 74, the rate of change of the torque within the transition region 72 is not constant. In order to prevent harsh gear lash when the M/G switches from positive torque to negative torque, the transition region 72 includes a lash phase 76 and a blend-in phase 78. The lash phase 76 is defined by a time period during which a rate of change of torque is predefined and that encompasses a time period where gear teeth of the powertrain of the vehicle switch mating surfaces. In the illustrated plot, the lash phase begins at time $T_2$ and ends at time $T_3$. The reduced rate of change of the torque during the lash phase 76 allows the gears to un-mesh and re-mesh in a softer manner than if a continuous high rate of change of torque was continuously provided between the steady state phases. The blend-in phase 78 is defined between the lash phase 76 and the negative steady-state phase 74. The blend-in phase 78 begins at the end of the lash phase (time $T_3$) and ends at the beginning of the steady-state phase (time $T_4$). The rate of change of the torque during the blend-in phase 78 is much greater than the rate of change of the torque during the lash phase 76. Ideally, the rate of change of torque during the blend-in phase 78 is constant. Used herein the term constant is to be construed or understood to mean within 3% of a commanded value. Note: the numbers of the chart are an example only and are not limiting.

Figure 4:
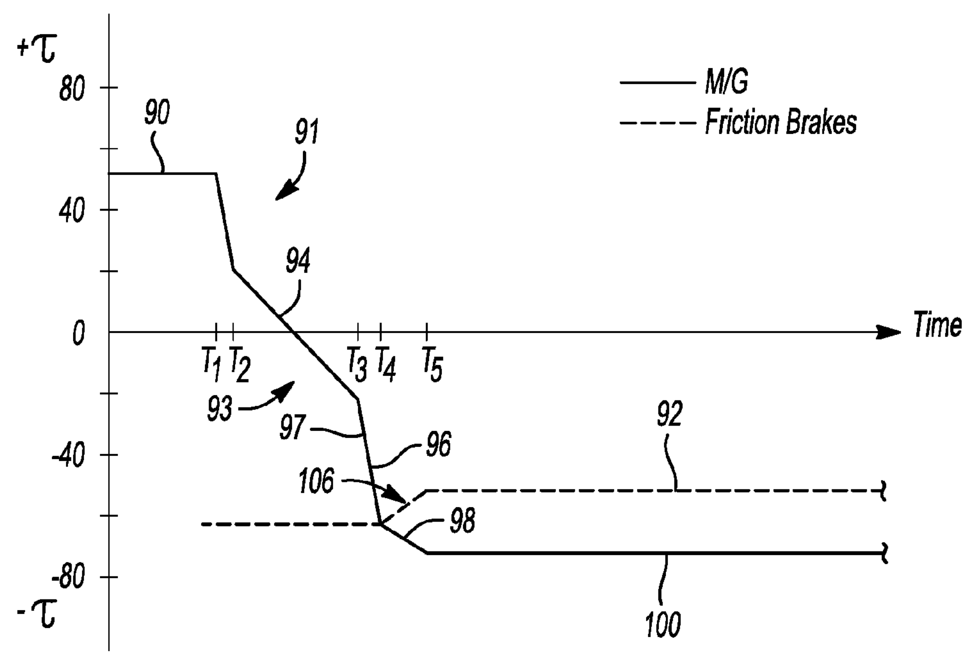
FIG. 4 is a regenerative torque plot for a braking event according to a control strategy that calculates motor losses at a current torque output.

FIG. 4 illustrates a torque plot for the M/G and the friction brakes when the M/G torque limits are calculated based on current M/G torque. FIG. 4 highlights some potential deficiencies of such control strategies. In the FIG. 4 example, the traction battery is less than or equal to zero degrees Fahrenheit. Prior to time $T_1$, the vehicle is moving forward down the road and the M/G is supplying a steady-state positive torque 90. In response to the vehicle braking at time $T_1$, the controller calculates a torque split between the M/G and the friction brakes.

For example, at time $T_1$ the controller determined that 120 Nm of total braking torque is being requested by the driver. To maximize possible regenerative braking, the controller attempts to provide as much of the 120 Nm of braking torque with the M/G as possible. The regenerative braking torque capacity of the M/G is either limited by the mechanical torque limits of the M/G or the battery power torque limits. Under many operating conditions, the mechanical limits and the battery limits are similar values, however, in this example, the battery is at or below 0° F., which causes the battery limits ($\Sigma^b_{min}$) to be greater (i.e. less negative) than the mechanical limits ($\tau^m_{min}$). As discussed above $\tau^b_{min}$ is calculated using equation 2. In this example, the controller calculates using the current M/G torque of 50 Nm at time $T_1$. Using the current M/G torque (50 Nm) to calculate the battery limits, the controller determined that the M/G could provide −60 Nm of torque and assigned −60 Nm of torque to the friction brakes.

FIG. 4 illustrates the calculated M/G torque, the actual M/G torque, and the friction brakes torque for an example braking event. Because the battery limits were calculated at the current M/G torque (50 Nm) and not at the expected torque, the amount of power captured into battery is not maximized. The actual power into battery is less than battery charge limits. This is because the M/G losses increased as absolute M/G torque increased from 50 Nm to 60 Nm. Once the M/G torque decreased past −50 Nm, the M/G losses exceeded the losses used to calculate the desired −60 Nm M/G torque. This led to an underestimate of M/G requested torque. At T4, the controller recalculated the battery limit using the present motor torque (−60 Nm) and determined that the M/G could provide −70 Nm of torque and assigned −50 Nm of torque to the friction brakes. This caused the blend-in phase 96 to have multiple rates of change, unlike blend-in phase 78, which had a constant rate of change from start to end.

At time $T_1$, the friction brakes are applied and the M/G begins transitioning from providing a positive torque of 50 Nm to providing a negative torque of −70 Nm, which is the calculated steady-state torque phase 100. The M/G torque plot 91 includes a transition region 93 defined between the positive torque steady-state phase 90 and the negative torque steady-state phase. The transition region 93 includes a lash phase 94 similar to the lash phase 76 of FIG. 3. The transition region 93 also includes a blend-in phase 96 defined between the lash phase 94 and the steady-state phase. Ideally, the blend-in phase has a constant rate of change of torque. But, in the FIG. 4 example, the blend-in phase 96 has a first segment 97 having a first rate of change of torque, and a second segment 98 having a second rate of change of torque. The first segment 97 occurs between times $T_3$ and $T_4$, and the second segment 98 occurs between times $T_4$ and $T_5$. The first segment 97 matches the calculated blend-in phase, which was calculated to extend between the end of the lash phase 94 and the beginning of the steady-state phase 100. Beginning at time $T_4$, the M/G requested torque is calculated using present M/G losses resulting in less requested torque from M/G. As the controller adjusts the requested M/G torque based on changing M/G torque losses, the rate of change of torque decreases to that shown by the second segment 98. The second segment 98 (and the blend-in phase as a whole) ends when the M/G reaches its limit, which marks the beginning of the steady-state phase 100. In response to the decreased (i.e. more negative) torque output of the M/G, the controller makes an adjustment 106 to the friction brake torque 92 to account for the change in M/G regenerative torque. While the controller is able to adjust the friction brake torque to make up for the miscalculated M/G regenerative torque, the driver of the vehicle may feel a reduced braking performance during the adjustment. This may be unsatisfactory.

Comparing FIGS. 3 and 4, it can be seen that calculating the torque limits base on expected M/G torque (versus current M/G torque) allows for a constant friction brake torque. The blend-in phase has a constant rate of change and does not have an adjustment segment. This may provide a more satisfactory brake feel to the driver. In the FIG. 3 example, the traction battery was at or below 0° F. In response to the vehicle braking, the controller determined that 120 Nm of braking was requested by the driver. Rather than calculating the M/G limits at the current torque of 50 Nm, the M/G limits were calculated at an expected M/G torque. The expected M/G torque may be the minimum torque limit as it is advantageous to provide as much of the braking using the M/G as possible. The controller then calculated the M/G losses based on the minimum torque and correctly determined that the M/G could provide −70 Nm of torque. The controller then assigned −50 to the friction brakes.

Correctly determining the M/G limits is also applicable to operating the transmission. In a vehicle with a step-ratio transmission, it is often desirable to reduce torque to the input shaft of the transmission while shifting to a higher gear. This event is referred to as upshift torque reduction. Reducing the input torque during the shift counters inertia torque, which would otherwise cause a disturbance noticeable to the driver (e.g. an acceleration of the vehicle). In a conventional vehicle, upshift torque reduction is accomplished by retarding the engine spark (gasoline engine) or reducing fuel (diesel engine). In a hybrid vehicle, such as HEV 10, two power sources are attached to the input of the transmission (e.g. the engine and the M/G). Either of these power sources can be used to honor the torque-reduction command and thus the controller must determine which power source to use and in what amount in order to accomplish the upshift torque reduction.

In many scenarios, it may be desirable to use the M/G to honor the torque-reduction command up to the M/G's limit and then supplement the M/G with the engine if the torque-reduction command exceeds the M/G's torque limit. Similar to the example above, in some situations, calculating the torque limit based on current operating torque results in under estimating the torque limit and the inability to use all the available M/G torque to provide the requested torque. When this occurs, a constant acceleration of the vehicle is not maintained through the shift.

Figure 5A:
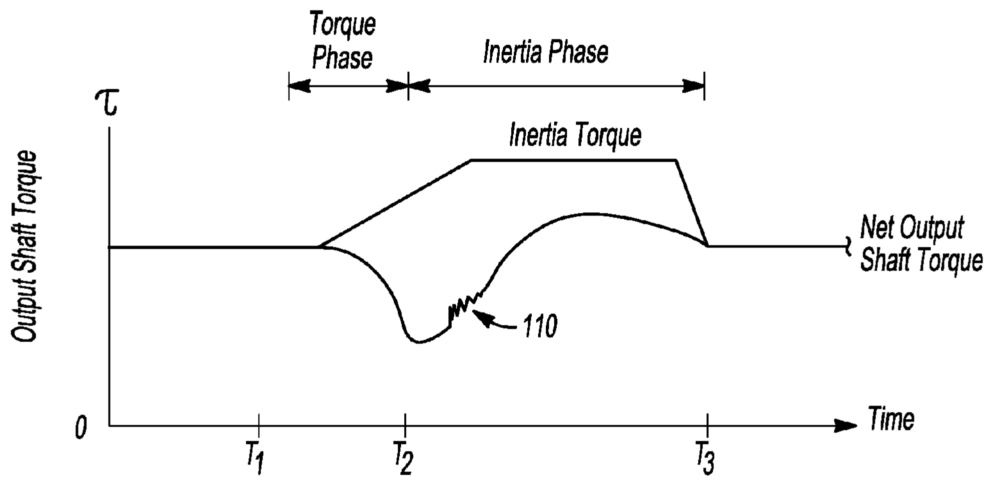
FIGS. 5A-5C are torque plots of a transmission output shaft, a transmission input shaft, and an engine and electric machine torque, respectively, during a transmission upshift according to a control strategy that calculates motor losses at a current torque output.
Figure 5B:
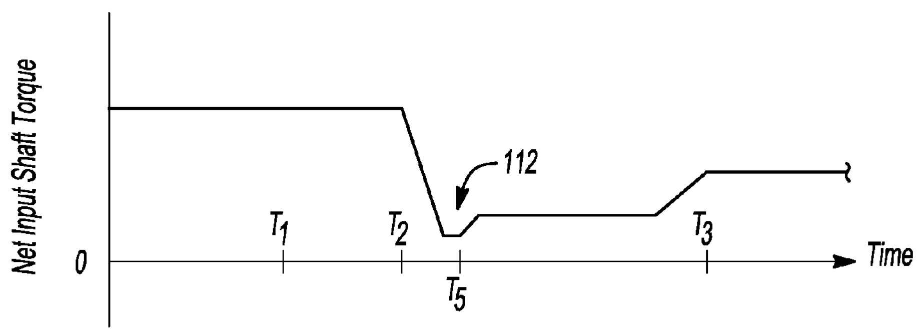
Figure 5C:
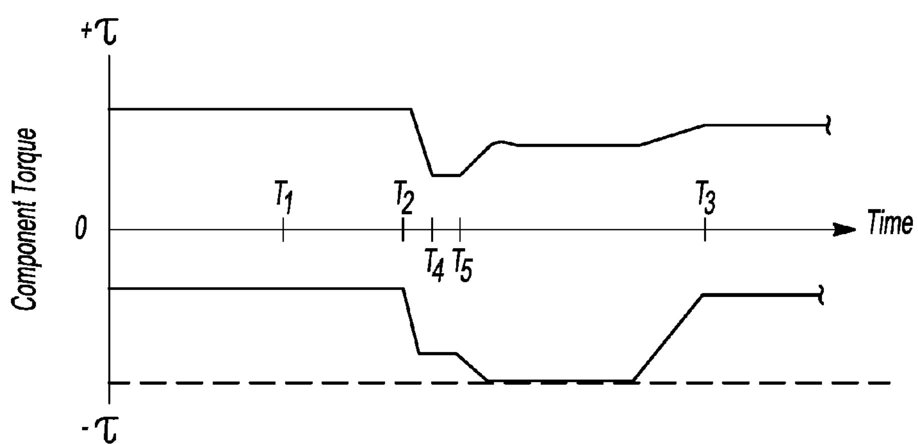

FIG. 5A to 5C illustrates a torque plots for various vehicle components during a transmission upshift from first gear to second gear. It is to be understood that the teachings of FIGS. 5A to 5C are applicable to any type of upshift such as third gear to fourth gear and are not limited to 1-2 gear shifts. Used herein the term "first gear" refers to the gear in the transmission having the highest gear ratio and the term "second gear" refers to the gear in the transmission having the second highest gear ratio. In this example, the M/G torque limits are calculated based on current M/G torque. FIGS. 5A to 5C highlights some potential deficiencies of such control strategies. In the example, the traction battery is less than or equal to zero degrees Fahrenheit.

Time $T_1$ marks the beginning of the 1-2 gear shift. Between time $T_1$ and $T_2$ is the torque phase of the shift, where the offgoing clutch pressure is reduced, and the oncoming clutch pressure is increased. The inertia torque is released as the gear ratio changes. Time $T_2$ marks the beginning of the inertia phase and time $T_3$ marks the end of the inertia phase. At time $T_2$ the controller will issue a torque-reduction command requesting a reduced input shaft torque to offset the inertia torque. Prior to time $T_2$, the torque-reduction command is inactive and may be held at an out-of-range value. The torque-reduction command is held throughout the inertia phase and is inactivated at time $T_3$, at which point the input shaft torque is increased to the level desired in second gear.

As explained above, the reduced input shaft torque can be supplied by either the M/G and/or by the engine. It may be advantageous to use the M/G rather than the engine to reduce the input-shaft torque if possible. The M/G can supply the torque reduction alone as long as the required torque reduction does not exceed the M/G limits. At time $T_1$, the shift begins and the controller calculates the torque reduction required to offset the inertia torque. In this example, the controller uses the current torque level to calculate the losses and determines that the M/G is unable to provide the required torque reduction alone and calculates a split between the M/G and the engine. Because the controller calculated the losses at the current torque, as opposed to an expected torque, the controller underestimates the minimum torque limits of the M/G. At time $T_2$, the M/G begins to provide a negative torque to the transmission input shaft and the spark of the engine is retarded according to the torque-reduction command. As the M/G provides additional torque the losses increase and, at time $T_4$, the controller determines that the M/G could be providing more negative torque and recalculates the torque-reduction command accordingly. At time $T_5$, the M/G is increased (more negative) to the actual motor limit and engine torque is increased accordingly. A bobble 110 on the output shaft torque occurs just after time $T_2$ due to the readjusting of the torque split provided to the input shaft by the engine and the M/G. Unlike a properly executed shift, where the acceleration the vehicle is constant throughout the shift, the inability of the controller to correctly anticipate the M/G torque causes the vehicle to accelerate.

Figure 6A:
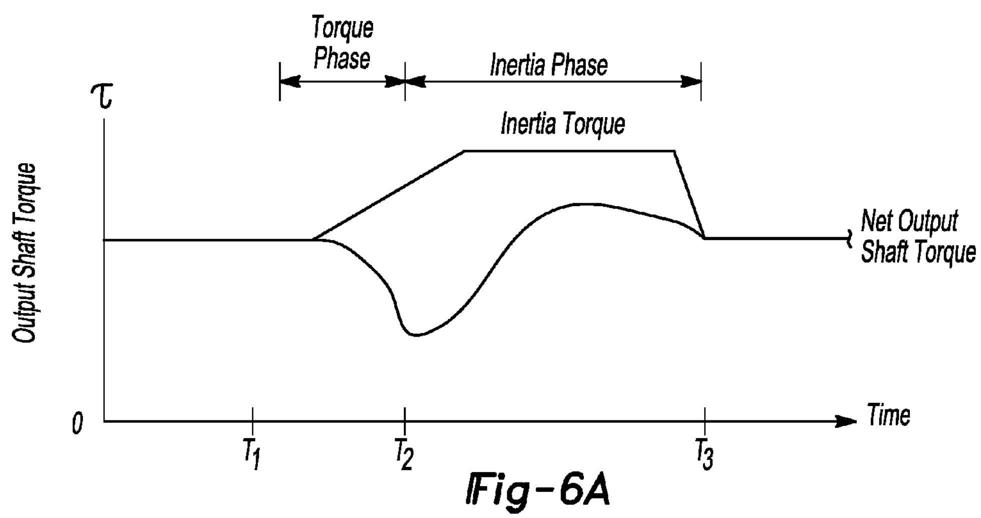
FIGS. 6A-6C are torque plots of a transmission output shaft, a transmission input shaft, and an engine and electric machine torque, respectively, during a transmission upshift according to a control strategy that calculates motor losses at an expected torque output.
Figure 6B:
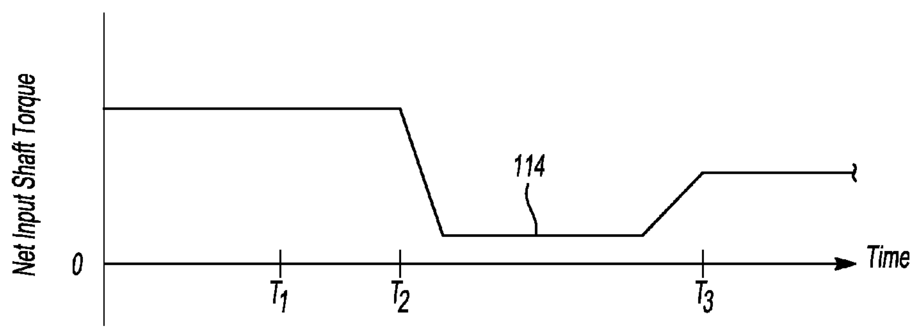
Figure 6C:
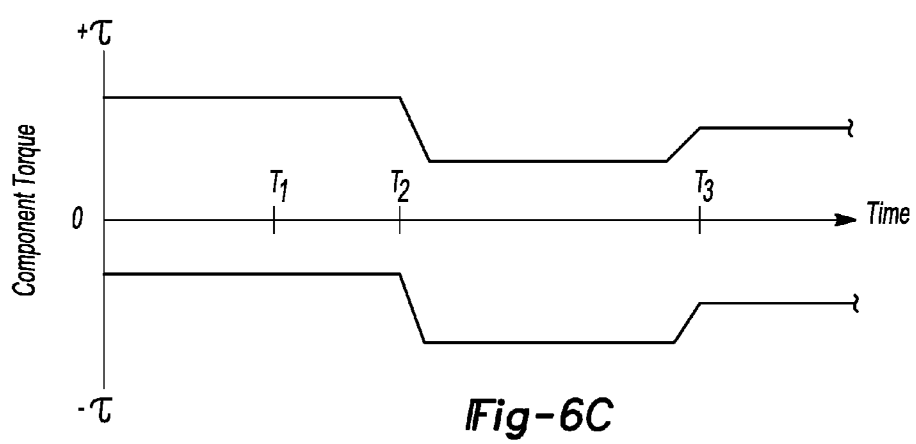

FIGS. 6A to 6C illustrate various torques during a 1-2 upshift of the transmission 16. The shift begins at time $T_1$ and ends at time $T_3$. The torque phase is defined between times $T_1$ and $T_2$, and the inertia torque phase is defined between times $T_2$ and $T_3$. In this example, the M/G losses are calculated at the expected torque rather than at the current torque levels. By doing this, the controller correctly determines the M/G torque limit and calculated a torque split between the engine 14 and the M/G 18. At time $T_z$, the controller issues a torque-reduction command to both the M/G 18 and the engine 14 until time $T_3$, when the inertia torque phase ends.

Comparing FIGS. 5B to 6B, 5B includes an unexpected increased input torque at 112, whereas 6B does not. In the FIG. 6 example, the input shaft torque reduces to a constant reduced torque 114, which is maintained at a constant (or near constant) value throughout the inertia phase. Thus, a bobble (compare FIGS. 5A and 6A) does not occur in the output shaft torque and the vehicle maintains a constant acceleration throughout the shift.

Correctly determining the M/G limits is also applicable to starting the engine. In some embodiments, the vehicle 10 may include a dedicated starter motor for starting the engine 14. Here, the starter motor may be powered by an auxiliary low-voltage battery. But, in other embodiments, the M/G 18 may be used to start the engine 14. The M/G 18 may start the engine 14 by engaging the clutch 26 and applying torque from the M/G 18 to the crankshaft of the engine 14 causing the engine to turnover. The engine 14 has a threshold torque ($\tau_{eng}$) that represent the minimum torque required to turn the engine over. In order to start the engine 14, the M/G 18 must be able to provide at least $\tau_{eng}$. Prior to starting the engine, the vehicle 10 is operating in electric-only mode in which the M/G 18 is supplying all of the torque requested by the driver. In order to have a smooth engine start, the M/G 18 must be able to provide not only the driver-demanded torque but also $\tau_{eng}$. If the driver-demanded torque plus the $\tau_{eng}$ exceeds the M/G limits, the vehicle will decelerate upon engagement of the clutch 26, which results in an unsatisfactory driving experience. In some scenarios, if the controller calculates the M/G limits based on current M/G torque, the controller may overestimate the M/G limits and the M/G may be unable to deliver the calculated torque leading to a driving experience similar to that described above. In order to avoid this unsatisfactory operation, the controller may calculate the M/G limits based on losses at the expected M/G torque. This ensures that the M/G can provide the calculated torque.

For example, at time $T_1$, the vehicle 10 is operating in electric-only mode and the electric machine 18 is currently providing all of the torque to propel the vehicle. The traction battery 20 is at or below 0° F. At time $T_2$, the driver increases his torque request and in response, the controller determines if the M/G 18 is able to provide the requested torque or if the engine 14 must be started. In this example, the M/G 18 is used to start the engine 14 by engaging the clutch 26. Thus, the controller must add $\tau_{eng}$ (e.g. 120 Nm) to the driver-demand torque to determine if the engine 14 must be started. The controller may determine if the engine 14 must be started by comparing the maximum M/G torque to the sum of the driver-demanded torque plus $\tau_{eng}$. The maximum M/G torque is not a constant value and changes based on many parameters. Particular to this example, the maximum M/G torque varies based on the electrical power losses. As described above, the power losses increase as M/G torque increases: miscalculating the power losses could yield an over estimate for the maximum M/G torque leading to a deceleration of the vehicle during engine start. If the vehicle 10 is operating according to one embodiment of this disclosure, at time $T_2$ the controller calculates the maximum M/G torque based on the power loss at the battery limit and correctly determines the maximum M/G torque (e.g. 220). In contrast, a vehicle that calculates electrical power losses at the current torque level will overestimate the maximum M/G torque (e.g. 240). If the driver-demanded torque at time $T_2$ is 225 Nm, a controller (operating according to one embodiment of the current disclosure) would start the engine as the required torque of 225 Nm exceeds the maximum M/G torque of 220 Nm. But, a controller calculating loss based on current M/G torque, would attempt to provide the torque with only the M/G due to the overestimated maximum M/G torque. Here, the M/G would fail to provide the driver-demanded torque as 225 Nm exceeds the actual maximum M/G torque of 220 Nm. Moreover, the M/G does not have any torque capacity left to start the engine. Thus, torque slated for the driving wheel must be sent to the engine causing the vehicle to decelerate during engine start, whereas a vehicle operating according to one embodiment of this disclosure will maintain a constant acceleration of the vehicle during starting of the engine.

Figure 7:
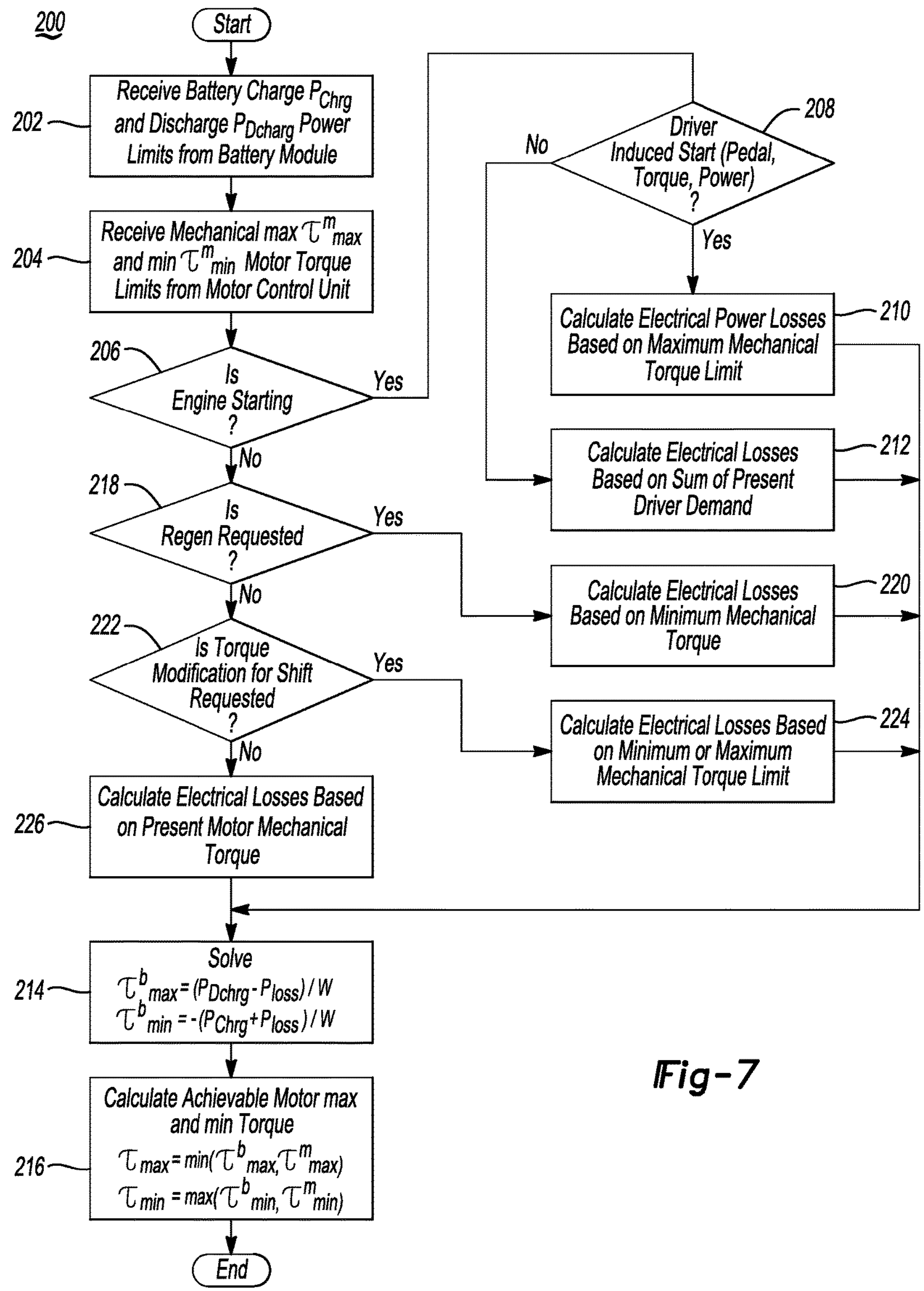
FIG. 7 is a flow chart of a control strategy according to one embodiment of this disclosure.

The embodiments of the present disclosure are directed to a control strategy or algorithm for operating the M/G 18 and other associated components. FIG. 7 is a flowchart 200 for operating three different types of vehicle modes: i) engine start, ii) regenerative braking, and iii) torque modification for transmission shifting. At operation 202, the controller 50 receives the charge-power limits and/or the discharge-power limits from the battery module. The charge and discharge limits are calculated by the battery module and are a function of at least battery state of charge, and battery temperature. At operation 204 the controller receives the mechanical M/G torque limits ($\tau^m_{max}$ and $\tau^m_{min}$) from the controller. At operation 206 the controller determines if the engine is starting. If the engine is starting, control passes to operation 208 and the controller determines if it is driver-induced start or a system-induced start. Driver-induced starts may be in response to relatively driver torque requests, accelerator tip-in, or power requests. System-induced starts may be in response to low battery SOC, cabin heating, catalytic converter temperature, or any other operation that requires the engine to be running.

If it is a driver-induced start, control passes operation 210 and the electrical power losses are calculated based on the maximum mechanical torque limit plus a calibratable value. Inclusion of the calibratable value is optional. The calibratable value, if included, accounts for part-to-part variations and/or provides a margin of error in the calculations. The electrical power losses are a function of M/G torque: power losses generally increase as the M/G torque increases. The electrical power loss may be programmed as one or more maps stored in memory. During operation 210, the controller retrieves and/or receives the electrical-power-loss value at the maximum mechanical torque limit. At operation 214, using Eq. 1, the controller calculates $\tau^b_{max}$ using the charge-power limits from operation 202 and the electrical-power-loss value from operation 210. Next, control passes operation 216 and the controller determines the maximum M/G torque available using Eq. 3.

If it is a battery-module induced start, control passes to 212. Unlike driver-induced starts, for battery-induced starts, the controller calculates the electrical losses based on a sum of present driver demand plus a calibratable value. The calibratable value includes the nominal torque required to start the engine and optionally includes an additional margin for error. The controller then calculates $\tau^b_{max}$ and $\tau_{max}$ using equations 1 and 3, respectively, at operations 214 and 216.

If at operation 206 the engine is not starting control passes to operation 218 and the controller determines if regenerative braking is being requested. The controller may determine this by monitoring a pedal position for the brake pedal or based on a torque request from the brake-control unit. If regenerative braking is being requested, control passes to operation 220 and the controller calculates the electrical losses based on the minimum mechanical torque limit plus an optional calibratable value. As explained above, the controller determines the electrical losses by retrieving data from mapping stored in memory. The controller then calculates $\tau^b_{min}$ and $\tau_{min}$ using equations 2 and 4, respectively, at operations 214 and 216.

If at operation 218 regenerative braking is not being requested, control passes to operation 222 and the controller determines if the torque modification for shifting is being requested. At operation 224 the controller calculates the electrical losses. If the transmission is up shifting, the electrical losses are calculated based on the minimum mechanical torque limit. If the transmission is downshifting, the electrical losses are calculated based on the maximum mechanical torque limit. As explained above, the controller determines the electrical losses by retrieving data from mapping stored in memory. At operations 214 and 216, the controller either calculates $\tau^b_{min}$ and $\tau_{min}$, using equations 2 and 4, respectively, or calculates $\tau^b_{max}$ and $\tau_{max}$ using equations 1 and 3, respectively.

If at operation 222 the transmission is not shifting, control passes to operation 226 and the controller calculates the electrical losses based on the present M/G mechanical torque.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:

a traction battery;

an electric machine electrically connected to the battery; and a controller configured to, during an inertia phase of a transmission shift from first gear to second gear at a constant accelerator pedal position while battery temperature is less than zero degrees Fahrenheit, alter a torque output by the electric machine to offset inertia torque transfer to a driveline to maintain constant acceleration of the vehicle.

2. The vehicle of claim 1 further comprising a transmission having a gear box operably coupled to a differential by the driveline, wherein the electric machine further includes a shaft having a first end connected to an engine by a clutch and a second end operably coupled to an input shaft of a transmission.

3. The vehicle of claim 1 wherein the controller is further configured to alter the torque output based on power losses of the electric machine at a mechanical torque limit of the electric machine.

4. The vehicle of claim 1 further comprising an engine selectively coupled to the electric machine.

5. The vehicle of claim 4 wherein the controller is further configured to retard spark of the engine according to a minimum available torque of the electric machine that is based on power losses of the electric machine at a mechanical torque limit of the electric machine.

6. The vehicle of claim 2 wherein the engine, the clutch, the electric machine and the transmission are mechanically in series with one another.

7. A vehicle comprising:

an electric machine coupled to a driveline; and a controller configured to, in response to vehicle braking while traction battery temperature is less than zero degrees Fahrenheit, command the electric machine to apply a regenerative torque to the driveline such that the torque increases at a constant rate for an entirety of a blend-in phase, that follows a lash phase and ends at a steady state phase, of the electric machine.

8. The vehicle of claim 7 wherein the lash phase is defined by a time period during which a rate of change of torque is predefined, and encompasses a time period in which gear teeth of a powertrain of the vehicle switch mating surfaces.

9. The vehicle of claim 7 wherein the steady state phase is defined by a time period during which the controller is operating the electric machine to maintain a constant regenerative torque.

10. The vehicle of claim 7 wherein the regenerative torque has a greater rate of change during the blend-in phase than during the lash phase.

11. The vehicle of claim 7 wherein an amount of the regenerative torque is based on power losses of the electric machine at a minimum mechanical torque limit of the electric machine.

12. The vehicle of claim 7 further comprising an engine, wherein the electric machine further includes a shaft operably coupled to the driveline and coupled to the engine with a clutch.

13. The vehicle of claim 12 further comprising a transmission having a gear box operably coupled to the driveline and to the shaft.

14. The vehicle of claim 13 wherein the engine, the clutch, the electric machine and the transmission are positioned in series with one another.

15. A vehicle comprising:

an engine;

an electric machine selectively coupled to the engine via a clutch; and a controller configured to, in response to an engine start request while a traction battery temperature is less than zero degrees Fahrenheit, engage the clutch to start the engine and apply torque to the engine via the electric machine to maintain constant acceleration of the vehicle during starting of the engine.

16. The vehicle of claim 15 wherein, in response to the engine start request being initiated by a driver of the vehicle, the controller is further configured to apply the torque based on power losses of the electric machine at a mechanical torque limit of the electric machine.

17. The vehicle of claim 15 wherein, in response to the engine start request being initiated by the controller, the controller is further configured to apply the torque based on a sum of power losses of the electric machine at a torque output of the electric machine when the engine starts and a calibratable torque value.

18. The vehicle of claim 17 wherein the calibratable torque value is a torque required to turn over the engine.

19. The vehicle of claim 15 further comprising a transmission, wherein the electric machine further includes a shaft having a first end connected to the clutch and a second end operably coupled to a gear box of the transmission.

20. The vehicle of claim 15 wherein the engine, the clutch, and the electric machine are positioned in series with one another.

* * * * *